April 10, 1962 — L. REIFFEL — 3,029,342

NEUTRON DETECTION APPARATUS

Filed June 8, 1959 — 4 Sheets-Sheet 1

INVENTOR.
Leonard Reiffel
BY
Hill, Sherman, Meroni, Gross & Simpson
Att'ys

April 10, 1962 L. REIFFEL 3,029,342
NEUTRON DETECTION APPARATUS
Filed June 8, 1959 4 Sheets-Sheet 2

INVENTOR.
LEONARD REIFFEL

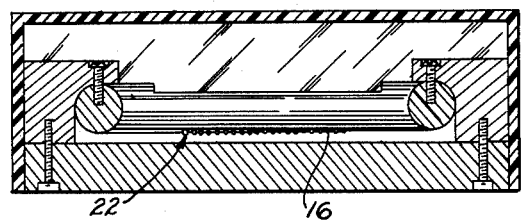
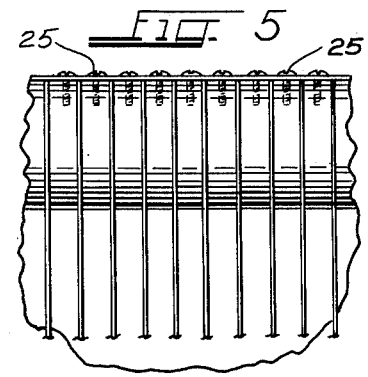
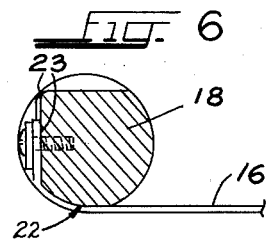
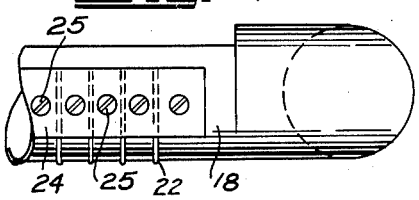
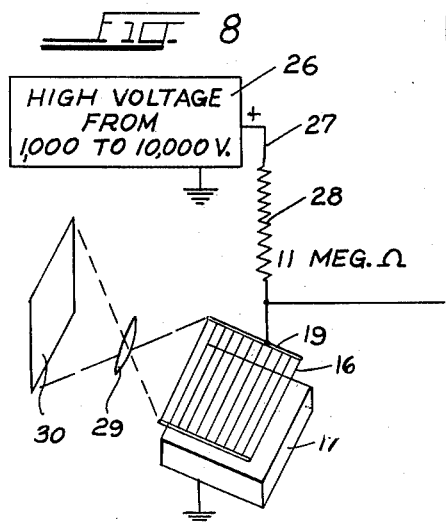

April 10, 1962 L. REIFFEL 3,029,342
NEUTRON DETECTION APPARATUS
Filed June 8, 1959 4 Sheets-Sheet 4
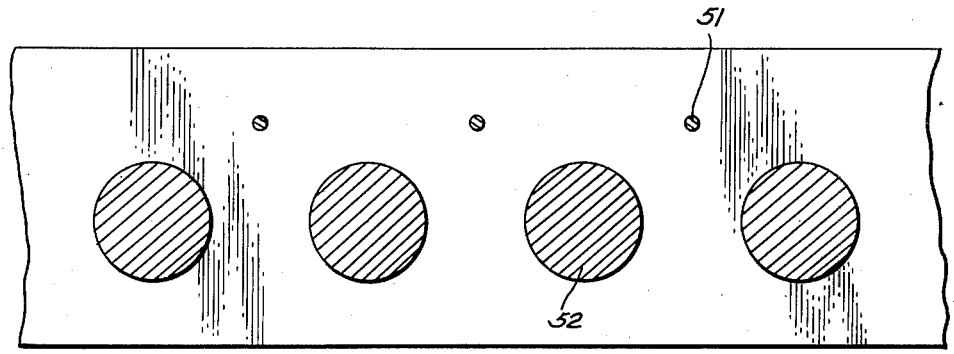
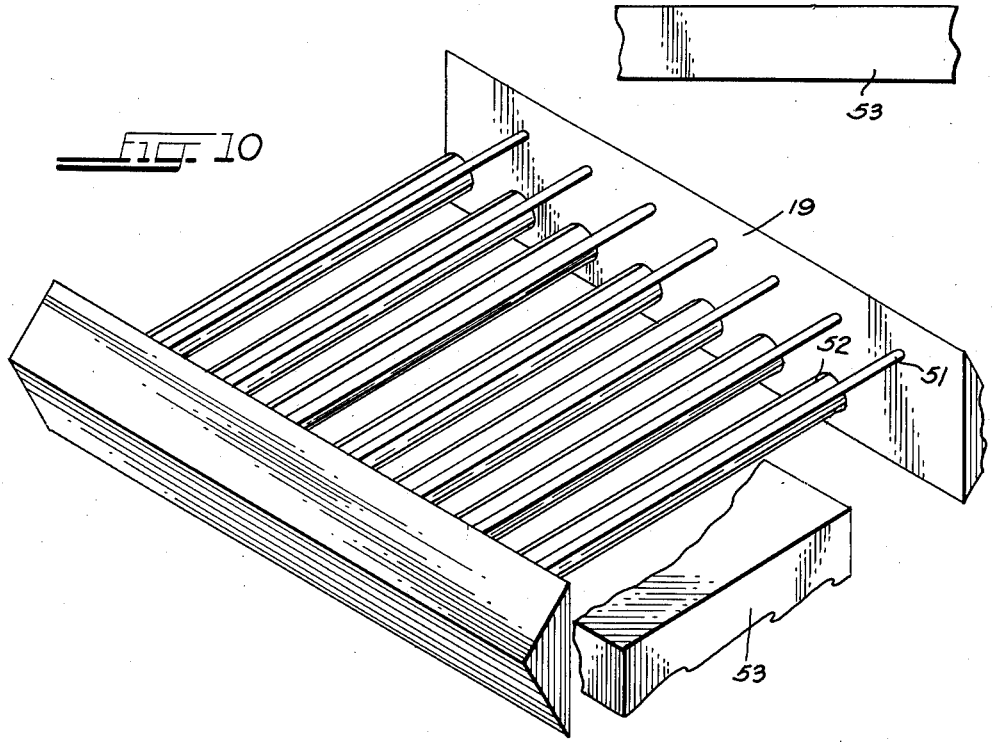
INVENTOR.
LEONARD REIFFEL United States Patent Office 3,029,342
Patented Apr. 10, 1962

3,029,342
NEUTRON DETECTION APPARATUS
Leonard Reiffel, Chicago, Ill., assignor to Armour Research Foundation of Illinois Institute of Technology, Chicago, Ill., a corporation of Illinois
Filed June 8, 1959, Ser. No. 818,966
21 Claims. (Cl. 250—83.1)

The present invention deals with radiation detection.

Also, the instant invention relates to a method and apparatus for determining the spatial distribution of neutrons, and more particularly relates to such method and apparatus whereby neutron detection is accomplished and the spatial configuration of the neutron field being investigated is determined by a spark counter unit hereinafter described.

The present application is a continuation-in-part of my co-pending application Serial No. 659,396, entitled "Method for Radiation Detection and Apparatus Therefor," filed May 15, 1957, now abandoned.

The determination of the spatial distribution of neutrons, especially those of the "slow" variety has long presented a serious problem in nuclear physics. As is well known to those skilled in this particular art, the problems relating to such determinations are encountered in various studies dealing with neutron diffraction, neutron scattering, reactor design and a multitude of other areas of interest, and to the best of my knowledge the known techniques, procedures and apparatus presently employed all suffer from one or more undesirable shortcomings, particularly when compared with the teachings of the present invention. Illustrative of this is the fact that all such known techniques utilize point detectors, e.g. boron trifluoride ($BF_3$) counters, which are moved into various positions in the neutron field for a point-by-point study. In nuclear diffraction experiments the $BF_3$ counter may be considered as an analogue of a Geiger counter spectrometer whereas on the other hand, the instant invention and particularly in some embodiments thereof, provides the analogue of a film camera which is useful for diffraction operations with the resultant simplicity of design and time-saving operation.

While the term is well known to the nuclear physicists, for purposes of the record by "slow neutron" is meant one which has been passed through paraffin or other similar target materials whereby upon collision with target protons a portion of the initial energy of the neutron is divided between such proton and the impinging neutron. The present invention is particularly applicable in the detection and spatial distribution determinations of such slow neutrons, but it should be understood that all types of neutrons may be studied in accordance with the teachings of my invention.

One of the reasons why the aforementioned determinations have presented such considerable difficulty in the past is the fact that photographic film per se is not sufficiently sensitive to neutrons to measurably react therewith even when such film is loaded with high cross-section elements, and thus, in order to provide photographic type apparatus for neutron distribution studies or neutron detection purposes either energy must be imparted to the event to be photographed or the effect of such particles must be so modified in order that photographic film will sense such modified effect. The instant invention is directed to the method and apparatus whereby the effect of neutron impingement is so modified that a photographable event is produced and such event is then photographed or recorded in an equivalent manner.

In view of the foregoing discussion, a primary object of the instant invention is to provide a method and related apparatus whereby the geometrical distribution of neutrons and especially slow neutrons, may be visualized and records of such distribution may be readily made.

Another object of the instant invention is to provide a method for radiation detection and apparatus therefor in which an energized spark counter is responsive to impinging radiation and the effects thereof are recorded.

Another object of the instant invention is to provide a method for neutron detection and apparatus therefor in which an energized spark counter is actuated by impinging neutrons and the actuational effects of such neutrons are in turn recorded upon a photographic plate or the like.

A further object of the instant invention is to provide apparatus for determining neutron distribution in which an array of wires suspended above a plate or the like forms the basic structural component thereof.

Still another object of the instant invention is to provide apparatus for determining neutron distribution in which an array of points suspended above a plate or the like is the basic structural component thereof.

Another object of the instant invention is to provide apparatus for determining neutron distribution in which a flat plane electrode suspended above a plate or the like is the basic structural component.

Another object of the instant invention is to provide apparatus for determining neutron distribution in which the neutron sensor element is composed of anodes formed of small diameter wires and cathodes formed of relatively larger diameter wires wherein the cathode wires are positioned in a plane separated from the plane of the anodes and displaced such that they preferably lie in the midpoint between such two anode wires.

Yet another object of the instant invention is to provide a method for detecting neutrons and the spatial distribution of such neutrons wherein such radiation is directed onto an ionizing radiation producing element and in turn the radiation thus produced takes part in a spark formation which is then recorded.

Other and further objects, features and advantages of my invention will become apparent to those skilled in this particular art from the following detailed disclosure thereof and the drawings attached hereto and made a part hereof in which:

FIGURE 4 is a view taken along the line 4—4 of FIGURE 1;

FIGURE 5 is a view taken along the line 5—5 of FIGURE 3;

FIGURE 6 is a view taken along the line 6—6 of FIGURE 3;

FIGURE 7 is a view taken along the line 7—7 of FIGURE 2;

FIGURE 8 is a wiring diagram and outline of the overall system involved herein;

FIGURE 9 is a side view of the preferred embodiment of my invention illustrating a wire-wire detection system; and FIGURE 10 is an enlarged view of the wire unit disclosed in FIGURE 9.

Figure 1:
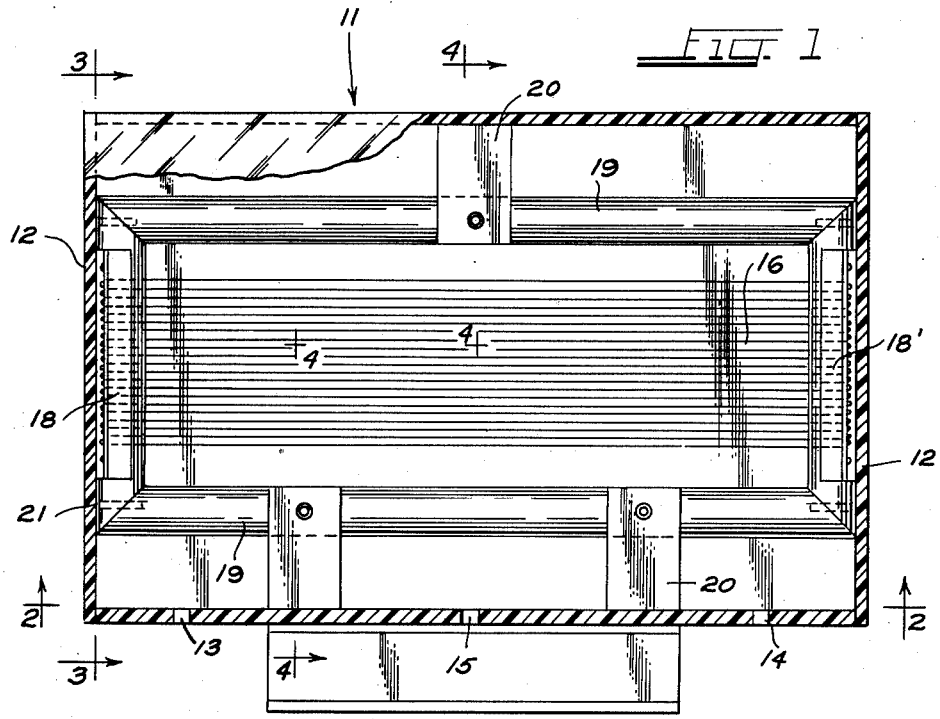
FIGURE 1 is a top view of the spark chamber useful herewith.
Figure 2:
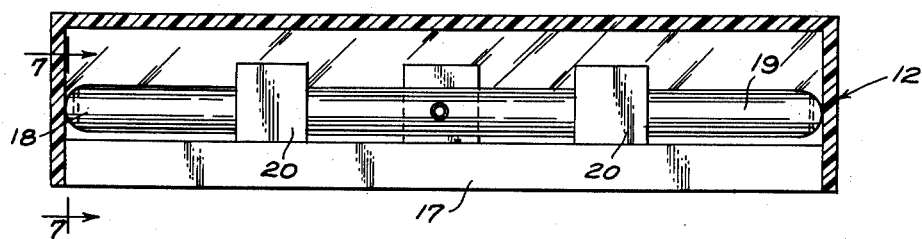
FIGURE 2 is a view taken along the line 2—2 of FIGURE 1.
Figure 3:
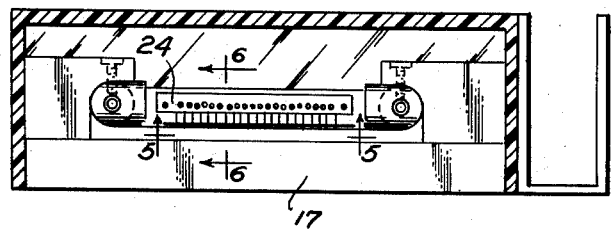
FIGURE 3 is a view taken along the line 3—3 of FIGURE 1.

Before entering into a detailed description of several various embodiments of my invention, the novel concepts underlying the devices hereinafter presented should be briefly considered. A spark counter consisting of multiple wires, or a flat plane, or a series of points suspended above a plate, such wires, points or planes being at a high positive potential with respect to the plate, forms the basic construction of one set of embodiments of the instant system. The plate or anode members of the system in some embodiments are coated with materials as for example, boron which gives rise to ionizing radiation upon being impinged with neutrons. In the preferred embodiment of my invention a set of wires forming an anode and a second set of wires forming a cathode are utilized either with or without a base plate.

In its most essential features the operation of the present invention involves the production of ionizing radiation by neutron impingement, such ionizing radiation consisting of protons, alpha particles or various other heavier atomic fragments, which ionizing radiation in turn by passage into an intense electric field, provided of course, that a suitable atmosphere is available, causes the production of a spark in substantially the same area of neutron impingement. All of the herein presented embodiments of my invention make use of such phenomena.

As indicated above, boron, as one example, is especially well-suited for neutron detectional operations, for as a neutron strikes a boron surface highly ionizing radiation originates from the boron (N, alpha) reaction as follows:

$$n^1_0 + B^{10}_6 \rightarrow He^4_2 + Be^7_4$$

When the instant apparatus is utilized, such reaction results in the formation of a spark across the plate-wire, plate-point or wire-wire gap at the point of neutron impingement. The ionizing radiation, i.e., helium nucleus, thus produced when subjected to the action of an electric field gives rise to a spark, and I have found that the spark so produced is localized at the point of origin of the ionizing radiation. Thus, by the utilization of this mechanism the distribution of sparks along a guitar-like array of wires or points is correlated with the distribution of the neutron field across the plane of the wires.

Under normal operating conditions a continuing corona may arise along the wires and in view of this it becomes necessary in some instances to discriminate between a neutron-generated spark and such corona. I accomplish such discrimination by optical recording of the sparks and the use of an interposed filter which blocks the photons from the gas discharge but allows light from the sparks to reach the film. It should of course be understood that in those instances where the corona effect is not too severe the filter may be omitted from the system.

The resolution of the system is primarily determined by the particular electrode geometry employed; which, in turn, is dependent upon the pressure at which the system is operated. That is, the discharge properties are related to $$\left(\frac{E}{P}\right)$$

where E is the field strength and P is the pressure. Hence, if in a particular application a higher degree of resolution were required, an overall reduction in dimensions must be accompanied by a proportionate change in pressure to retain the characteristics of the discharge.

Referring next to the drawings wherein like numbers are used throughout to denote like parts:

The spark counter is generally indicated by the numeral 11. Its outermost walls 12 form a gas-tight container pierced only at two gas or vacuum ports 13 and 14 and an electrical conduit hole 15. The walls are conveniently made of a clear plastic material but opaque materials may be used in part so long as a transparent window is provided in the spark presentation area. It is preferred that the chamber be formed of an electrical non-conducting material to negate the problem of insulating the spark producing units from such container, primarily for safety purposes, but it should of course be understood that the walls may be made of, for example, an electrically conductive metal if it is provided that the spark producing elements be insulated therefrom.

In this particular embodiment of my invention a series of individual wires 16 are tautly strung across the spark presentation area. Such wires are elevated above a base plate 17 by the wire-holding bars 18 and 18' which are in turn supported by frame members 19 and standards 20. Such wires are positioned substantially equidistant from each other. The standards 20 are made from an electrically non-conductive material in one embodiment hereof in order to insulate the wires 16 and their support members from the base plate 17.

The wire-holding bars 18 are conveniently connected to frame members 19 by means of screws 21 or the like. Such bars have individual tapered grooves (see FIGURE 7) 22 and a flat outwardly facing surface 23 for holding taut and maintaining equal the separation of the wires 16. A back plate 24 holds the wires in place by being pressed tightly against the bar 18 by means of screw 25 and the tautness of each wire is assured by the utilization of a series of screws 25, each such screw being located to either side of an individual wire.

Figure 1A:
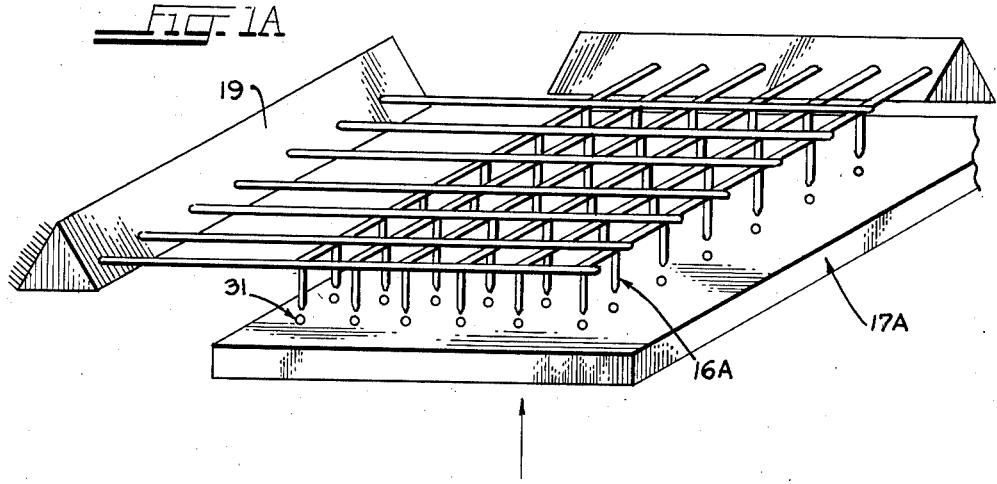
FIGURE 1A is an enlarged perspective view of another embodiment of the spark chamber useful herewith.
Figure 1B:
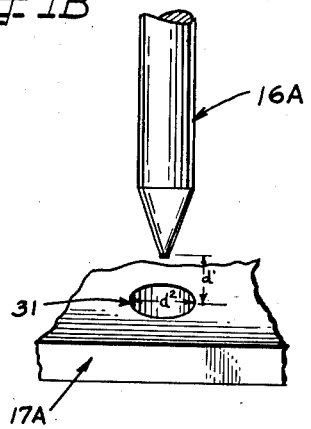
FIGURE 1B is an enlarged perspective view of a point-plate unit disclosed in FIGURE 1A.

FIGURES 1A and 1B depict an alternative embodiment of my invention. This embodiment consists of a series of conical electrodes 16A, slightly truncated, suspended on center over holes 31 drilled in cathode plate 17A. The holes 31 prevent the influence of oxidized cathode layers which tend to make the discharge unstable. The electrodes 16A may be suspended in any conventional manner as for example, by frame members 19. It is noted however, that electrodes 16A must be insulated from base plate 17A.

This alternative embodiment is advantageous in the production of a high resolution counter. It also may be made beta-ray sensitive and therefore X-ray or gamma radiation sensitive because it has an electric field configuration which collects electrons by two-dimensional focusing. That is, all ion pairs created are channeled toward the point and concentrated there. The term point as used herein is to denote the ends of the slightly truncated conical electrodes 16A most proximate to the base plate 17A. Such point is best shown with reference to FIGURE 1B.

Particularly as shown in FIGURE 8, for neutron detectional purposes a high voltage source 26 maintains a positive potential gradient of from 1,000 to 10,000 volts between the wires 16 and the base plate 17. Such source is connected to the wires 16 through lead 27, resistor element 28 and the frame member 19, the electrical lead 27 passing through hole 15 (see FIGURE 1) in the chamber to make such connection. The base plate on the other hand is grounded in order to maintain the aforesaid positive potential between the wires 16 and the plate 17.

All that is necessary, with respect to the electric field, is that the anodes be more positive than the cathodes. Consequently, a negative power supply may be used; in which case the anodes would be grounded. However, a positive supply is preferred in that such supply if negative exhibits greater capacity between elements to result in more stored charge, which in turn causes unnecessarily intense sparks.

If the alternative embodiment of FIGURE 1A were used in the same circuitry shown in FIGURE 8 can be utilized. However, in such embodiment the high positive potential 26 is applied through lead 27 and resistance 28 to electrodes 16A. Base plate 17A is grounded. Such embodiment affords more versatility in photographing the sparks in that the sparks can also be recorded from the bottom of base plate 17A; which direction is shown by the arrow in FIGURE 1A.

The aforedescribed embodiments of the instant device operate as follows: first of all the proper atmosphere for sparking purposes is created within the chamber. This is readily accomplished by flushing an appropriate gas in one port and out the other, or for most purposes, air may be most simply entrapped within the chamber. In various operations of the device I have utilized air, carbon dioxide in air or a gaseous mixture comprising 90% argon and 10% methane. It will be understood by those skilled in this art that many other gases may be used, it being required that they be capable of transmitting a spark. The necessary voltage is then applied to the wires 16, 16A and the neutron source under consideration is so positioned as to emit neutrons onto the counter. The impingement of such neutrons onto the base plate when such plate is coated for example with boron or other ionizing radiation emissive coating materials causes the reflection of ionizing radiation from the plate into the intense electric field which in turn results in sparks being produced along the wires 16 at substantially the point of neutron impact onto the plate. Such sparks are then recorded on the photographic plate 30. In some instances filter 29 is interposed between the spark counter and the photographic plate when corona effects are to be eliminated.

The filter when its use is required, is one that will pass the red end of the spectrum and block the blue. The exact wave length characteristics of such filter are unimportant since all that one wishes to do is to discriminate against the blue nitrogen corona in favor of the red lines excited by the spark and the spatial arrangement of the filter is simply such that the camera system observes the sensitive area of the counter in a reasonably undistorted manner.

When the instant invention is used for the detection of the fast neutrons a hydrogeneous coating on the plate is quite advantageous. In the case of fast neutron detection where only an air atmosphere is used the operator may coat the plate with a hydrogen rich film as for example polyethylene foil. Generally, any coating substance producing an (n, p), or (n, fission) reaction may be used.

The description of the preferred embodiment of my invention should be considered in conjunction with FIGURES 9 and 10, and which represent the neutron-induced spark producing device which provides optimum results. In such apparatus the anodes are fine wires, 51 and the cathodes are relatively larger diameter wires, 52 which lie in a plane separated from the anode wires and are so displaced relative thereto that they substantially lie at the mid-point between two anode wires. In some instances a boron or the like coated base plate 53 is positioned to either the anode or cathode side or in some instances to both sides of the spark unit, but as is illustrated in FIGURES 9 and 10 only one such plate is shown on the cathode side of the device. Such coated plate of course may be omitted from the instant system by the utilization of an appropriate atmosphere which emits the required ionizing radiation upon neutron impingement as hereinabove discussed. Such preferred spark unit is positioned within the spark chamber and utilizes substantially the same electrical system shown in FIGURE 8. However, in this case the high voltage source 26 leads into the wire-holding bar 19 and into wires 51 whereas the wires 52 are electrically insulated from the wires 51 and are grounded in a similar manner as is the base plate in the previously described embodiments hereof. Taking the preferred embodiment, i.e., that using the boron coated base plate the operation is quite similar to the foregoing embodiments. As a neutron impinges upon the boron coated plate 53 ionizing radiation is reflected back into the intense electric field existant between the anode and the cathode wires and in such intense field the interaction of the ionizing radiation therewith produces a spark at substantially the point of neutron impingement.

Various modifications in the configurations herein above described are of course permissible. In some instances the plate 17 or 53 may have instead of merely a flat surface an alternately ridged surface to increase the area thereof to further increase the efficiency of the device. In another modification the anode wires and in some instances the cathode wires may be connected from different resistors instead of merely one resistor in parallel as for example, groups of four or eight wires to again increase the efficiency of the device due to the fact that by such unitizing of wires the entire wire system does not discharge upon the impingement of an ionizing radiation. In a modification of the embodiment of FIGURES 1A–1B, the truncated electrodes may be stamped or punched from a suitable work piece and suspended over the base plate; it being noted that the distance "$D_2$" must be greater than "$D_1$" for optimum results.

One of the main purposes of my invention is, of course, not merely neutron detection, but the spatial distribution of such radiation. When my spark counting chamber is held stationary I obtain certain photographic information as to such distribution; the completeness of such information being somewhat dependent upon the closeness of consecutive wires. In order to obtain continuous sampling of the radiation present within the detection field of the wires it is merely necessary to move the wire array back and forth through a distance equal to the distance between two wires. In this manner the complete impact area of the radiation onto the counting chamber is sampled.

It will be understood that modifications and variations may be effected without departing from the spirit and scope of the novel concepts of the instant invention.

I claim as my invention:

1. Apparatus for determining the spatial distribution of neutrons comprising: a chamber having a light transparent area through which electrical sparks may be photographed; an array of individual wires suspended in said chamber; a base plate electrically insulated from said wires and so positioned relative thereto that a spark may be formed across the wire-base plate gap; means to create an electric field between said base plate and said wires wherein the wires are more positive than the plate; means which emits ionizing radiation into such electric field when impinged upon by a neutron substantially at the point of neutron impingement whereby a spark is formed between said wires and said base plate, and means whereby sparks thus produced are photographed.

2. The apparatus as set forth in claim 1 wherein a corona filtering means is interposed between the spark source and said photographic means.

3. Apparatus for determining the spatial distribution of neutrons comprising; a chamber having light transparent area through which electrical sparks may be photographed; an array of individual wires suspended in said chamber; a base plate, which emits ionizing radiation when impinged by a neutron, electrically insulated from said wires and so positioned relative thereto that sparks may be formed across the wire-base plate gap; means to create an electric field between said base plate and said wires wherein said wires are more positive than the base plate; and photographic means whereby sparks produced when the ionizing radiation enters said electrical field are recorded.

4. The apparatus as set forth in claim 3 wherein a corona filtering means is interposed between the spark source and said photographic means.

5. Apparatus for determining the spatial distribution of neutrons comprising; a chamber having a light transparent area through which electrical sparks may be recorded; an array of points suspended in said chamber; a base plate electrically insulated from said points and so positioned relative thereto that a spark may be formed across the point-base plate gap; means to create an electric field between said base plate and said points wherein said points are more positive than the base plate; means which emits ionizing radiation into such electric field when impinged upon by a neutron substantially at the point of neutron impingement whereby a spark is formed between said points and said base plate; and means whereby sparks thus produced are photographed.

6. The apparatus as set forth in claim 5 wherein a corona filtering means is interposed between the spark source and said photographic means.

7. Apparatus for determining the spatial distribution of radiation comprising: a chamber having a light transparent area through which electrical sparks may be recorded; an array of conical electrodes suspended in said chamber; a base plate electrically insulated from said electrodes and so positioned relative thereto that a spark discharge may be formed therebetween; means for establishing an electric field between the electrodes and the base plate; means upon said base plate which emits ionizing radiation into the electric field when impinged by radiation substantially at the point of radiation impingement whereby a spark is formed between the electrodes and the base plate; and means to photograph such sparks.

8. The apparatus as set forth in claim 7 wherein the ends of the conical electrodes most proximate to the base plate are slightly truncated.

9. The apparatus as set forth in claim 7 wherein a corona filtering means is interposed between the spark source and said photographic means.

10. Apparatus for determining the spatial distribution of radiation comprising: a chamber having a light transparent area through which electrical sparks may be recorded; an array of slightly truncated conical electrodes suspended in said chamber; a base plate electrically insulated from the electrodes having a plurality of holes therethrough and so positioned relative to the electrodes that the axis of each hole is concentric with an electrode suspended thereover whereby a spark discharge may be formed between the periphery of at least one of the holes and its respective electrode; means for establishing an electric field between the electrodes and the base plate wherein said electrodes are more positive than the base plate; means which emits ionizing radiation into the electric field existing between the electrodes and the base plate when impinged by radiation substantially at the point of radiation impingement whereby sparks are formed between said electrodes and said base plate; and means to photograph such sparks.

11. The apparatus as set forth in claim 10 wherein a corona filtering means is interposed between the spark source and said photographic means.

12. Apparatus for determining the spatial distribution of neutrons comprising: a chamber having a light transparent area through which electrical sparks may be photographed; a light transparent electrically conducting plane suspended in said chamber; a base plate electrically insulated from said plane and so positioned relative thereto that a spark may be formed across the plane-base plate gap; means to create an electric field between said base plate and said plane wherein said plane is more positive than said plate; means which emits ionizing radiation into such electric field when impinged upon by a neutron substantially at the point of neutron impingement whereby a spark is formed between said plane and said base plate, and means whereby sparks thus produced are photographed.

13. The apparatus as set forth in claim 12 wherein a corona filtering means is interposed between the spark source and said photographic means.

14. Apparatus for determining the spatial distribution of neutrons comprising: a chamber having a light transparent area through which electrical sparks may be photographed; a light transparent electrically conducting plane suspended in said chamber; a base plate which emits ionizing radiation when impinged by a neutron electrically insulated from said plane and so positioned relative thereto that sparks may be formed across the plane-base plate gap; means to create an electric field between said base plate and said plane wherein the plane is more positive than the plate; and photographic means whereby sparks produced when the ionizing radiation enters said electric field are recorded.

15. The apparatus as set forth in claim 14 wherein a corona filtering means is interposed between the spark source and said photographic means.

16. Apparatus for determining the spatial distribution of neutrons comprising: a chamber having a light transparent area through which electrical sparks may be photographed; a first array of individual wires suspended in said chamber; a second array of larger diameter wires suspended in said chamber insulated from said first array of wires and so positioned relative thereto that a spark may be formed across the gap between said wire arrays; means to create an electric field between said first array and said second array wherein the first array is more positive than the second array; means which emits ionizing radiation into such electric field when impinged upon by a neutron substantially at the point of neutron impingement whereby a spark is formed between said first and second arrays, and means whereby sparks thus produced are photographed.

17. The apparatus as set forth in claim 16 wherein a corona filtering means is interposed between the spark source and said photographic means.

18. Apparatus for determining the spatial distribution of neutrons comprising: a chamber having a light transparent area through which electrical sparks may be photographed; a first array of individual wires suspended in said chamber; a second array of larger diameter wires suspended in said chamber insulated from said first array of wires and so positioned relative thereto that a spark may be formed across the gap between said wire arrays, said wires of such second array being capable of emitting ionizing radiation when impinged by a neutron; means to create an electric field between said arrays wherein the first aray is more positive than the second array; and photographic means whereby sparks produced when the ionizing radiation enters said electric field are recorded.

19. The apparatus as set forth in claim 13 wherein a corona filtering means is interposed between the spark source and said photographic means.

20. Apparatus for determining the spatial distribution of neutrons comprising: a chamber having a light transparent area through which electrical sparks may be photographed; a first array of individual wires suspended in said chamber; a second array of larger diameter wires suspended in said chamber insulated from said first array of wires and so positioned relative thereto that a spark may be formed across the gap between said wire arrays; means to create an electric field between said first array and said second array; plate means which emits ionizing radiation into such electric field when impinged upon by a neutron substnatially at the point of neutron impigement whereby a spark is formed between said first and second arrays, and means whereby sparks thus produced are photographed.

21. The apparatus as set forth in claim 20 wherein a corona filtering means is interposed between the spark source and said photographic means.

References Cited in the file of this patent

Payne: Journal of Scientific Instruments, vol. 26, October 1949, pages 321–324.

Savel: Academie des Sciences Comptes Rendus, vol. 234, No. 27, June 30, 1952, pages 2596–2598.

Eichholz: Nucleonics, vol. 10, No. 10, October 1952, pages 46–49.